United States Patent
Li et al.

(10) Patent No.: US 12,051,928 B2
(45) Date of Patent: Jul. 30, 2024

(54) WASHING DEVICE, CONTROL METHOD THEREOF AND SMART HOME APPARATUS

(71) Applicant: LUXSHARE PRECISION INDUSTRY CO., LTD., Shenzhen (CN)

(72) Inventors: Huabing Li, Shenzhen (CN); Zhongyuan Lai, Shenzhen (CN); Yu Huang, Shenzhen (CN); Zhexian Tianzhou, Shenzhen (CN)

(73) Assignee: LUXSHARE PRECISION INDUSTRY CO., LTD., Shenzhen (CN)

( * ) Notice: Subject to any disclaimer, the term of this patent is extended or adjusted under 35 U.S.C. 154(b) by 319 days.

(21) Appl. No.: 17/750,696

(22) Filed: May 23, 2022

(65) Prior Publication Data
US 2023/0130076 A1 Apr. 27, 2023

(30) Foreign Application Priority Data
Oct. 25, 2021 (CN) .......................... 202111240293.7

(51) Int. Cl.
*H02J 7/00* (2006.01)
*A47K 5/18* (2006.01)
(Continued)

(52) U.S. Cl.
CPC .............. *H02J 7/0044* (2013.01); *A47K 5/18* (2013.01); *A61C 17/224* (2013.01); *H02J 50/005* (2020.01); *A61C 2204/002* (2013.01)

(58) Field of Classification Search
CPC ........ H02J 7/0044; H02J 50/005; A47K 5/18; A61C 17/224; A61C 2204/002
(Continued)

(56) References Cited

U.S. PATENT DOCUMENTS

| 4,121,600 A * | 10/1978 | Riddick | ................... A47K 5/18 132/310 |
| 2015/0182319 A1* | 7/2015 | Wagner | ................ A61C 17/224 132/308 |
| 2020/0046175 A1* | 2/2020 | Jenkins | ................... A47K 5/18 |

FOREIGN PATENT DOCUMENTS

| CN | 104220023 A | 12/2014 |
| CN | 204071874 U | 1/2015 |

(Continued)

OTHER PUBLICATIONS

Chen et al., "A concise tutorial of new technologies for mobile devices," Chongqing University Press, Aug. 31, 2016, pp. 101-103 (8 pages total), with English translation.

*Primary Examiner* — Tuan N Nguyen
(74) *Attorney, Agent, or Firm* — Birch, Stewart, Kolasch & Birch, LLP

(57) ABSTRACT

Provided are a washing device, a control method thereof and a smart home apparatus. The washing device includes a support plate, a charging cup, a liquid feeder and a power supply management system. A top surface of the support plate is provided with a first charging stand. The heating member can be electrically connected to the first charging stand. The liquid feeder is provided with a fluid inlet, a fluid outlet and an on-off switch. The power supply management system is connected to and controls the first charging stand and the on-off switch, the power supply management system receives a start-up instruction, controls the on-off switch to be turned on according to the start-up instruction to supply liquid to the charging cup, and controls the first charging stand to be electrified according to the start-up instruction to heat the liquid in the charging cup through the heating member.

20 Claims, 11 Drawing Sheets

(51) Int. Cl.
*A61C 17/22* (2006.01)
*H02J 50/00* (2016.01)

(58) Field of Classification Search
USPC ..... 4/517, 518, 675–678; 132/308, 310, 314
See application file for complete search history.

(56) References Cited

FOREIGN PATENT DOCUMENTS

| | | |
|---|---|---|
| CN | 108175533 A | 6/2018 |
| CN | 109044153 A | 12/2018 |
| CN | 110269533 A | 9/2019 |
| CN | 110801168 A | 2/2020 |
| CN | 210812721 U | 6/2020 |
| CN | 211796059 U | 10/2020 |
| CN | 212816606 U | 3/2021 |
| CN | 213487399 U | 6/2021 |
| CN | 214129561 U | 9/2021 |
| EP | 0 638 294 A2 | 2/1995 |
| JP | 4085121-81 | 5/2008 |
| WO | WO 2007/097527 A1 | 8/2007 |
| WO | WO 2021/072188 A1 | 4/2021 |

\* cited by examiner

WASHING DEVICE, CONTROL METHOD THEREOF AND SMART HOME APPARATUS

CROSS-REFERENCE TO RELATED APPLICATION(S)

This application claims priority to Chinese Patent Application No. 202111240293.7 filed Oct. 25, 2021, the disclosure of which is incorporated herein by reference in its entirety.

TECHNICAL FIELD

The present disclosure relates to the field of smart homes and, in particular, to a washing device, a control method thereof and a smart home apparatus.

BACKGROUND

The electric toothbrush has a good cleaning ability, so that the user's teeth can be cleaned further. Thus the user's teeth are more healthier and the electric toothbrush is widely used. When the electric toothbrush is used, the user first squeezes the toothpaste on the brush head, and then brushes the teeth. In order to improve the cleaning effect and prevent the toothpaste from remaining in the mouth, it is necessary to rinse the mouth with fresh water before and after brushing the teeth.

To further protect the teeth, especially for the children and the elderly with fragile gums, as brushing the teeth, the children and the elderly need to gargle with hot water. In the existing art, after the faucet is turned on, the hot water often cannot flow out in time, and cold water flows for a period of time first, so that water may be wasted when the user receives the hot water, and the user needs to wait for a relatively long time, thereby wasting the user's time.

SUMMARY

An object of the present disclosure is to provide a control method of a washing device and a smart home apparatus, which can heat liquid in a charging cup, reduce the water waste and prevent the energy waste on the basis of using hot water for gargling, and have higher intelligence and convenience.

As conceived above, the present disclosure provides the solutions below.

Provided is a washing device, including includes a support plate, a charging cup, a liquid feeder and a power supply management system. The support plate is provided with an accommodation chamber, and a top surface of the support plate is provided with a first charging stand.

The charging cup includes a cup body and a heating member disposed in the cup body, and the heating member is capable of being electrically connected to the first charging stand.

The liquid feeder is fixedly arranged on the support plate, and the liquid feeder is provided with a fluid inlet, a fluid outlet and an on-off switch, and the fluid outlet is capable of being positioned above the charging cup.

The power supply management system is disposed in the accommodation chamber, where the power supply management system is connected to the first charging stand and the on-off switch and is configured to control the first charging stand and the on-off switch, the power supply management system is configured to receive a start-up instruction, control the on-off switch to be turned on according to the start-up instruction to supply liquid to the charging cup, and control the first charging stand to be electrified according to the start-up instruction to heat the liquid in the charging cup through the heating member.

Provided is a smart home apparatus is provided, including an electric toothbrush, a travel receiving box and a washing device described below. The electric toothbrush is located in a toothbrush slot of the washing device or inserted in a second charging stand of the washing device, and the travel receiving box is capable of being inserted in a third charging stand of the washing device.

Provided is a control method of a washing device. The method is applied to the washing device described above and includes steps described below. A start-up instruction is received. A first control instruction is generated according to the start-up instruction, the first control instruction is configured to control an on-off switch to be turned on, so that the liquid feeder is capable of adding a second preset amount of liquid to the charging cup. A second control instruction is generated according to the start-up instruction, the second control instruction is configured to control the first charging stand to be electrified, so that the first charging stand supplies power to a heating member, and the liquid in the charging cup is heated to a first preset temperature through the heating member.

BRIEF DESCRIPTION OF DRAWINGS

To illustrate solutions in embodiments of the present application more clearly, the drawings used in description of the embodiments of the present disclosure are described briefly hereinafter. Apparently, the drawings described hereinafter only illustrate part of embodiments of the present application, and those skilled in the art may obtain other drawings based on the contents and drawings described in the embodiments of the present disclosure on the premise that no creative work is done.

REFERENCE LIST

Figure 1:
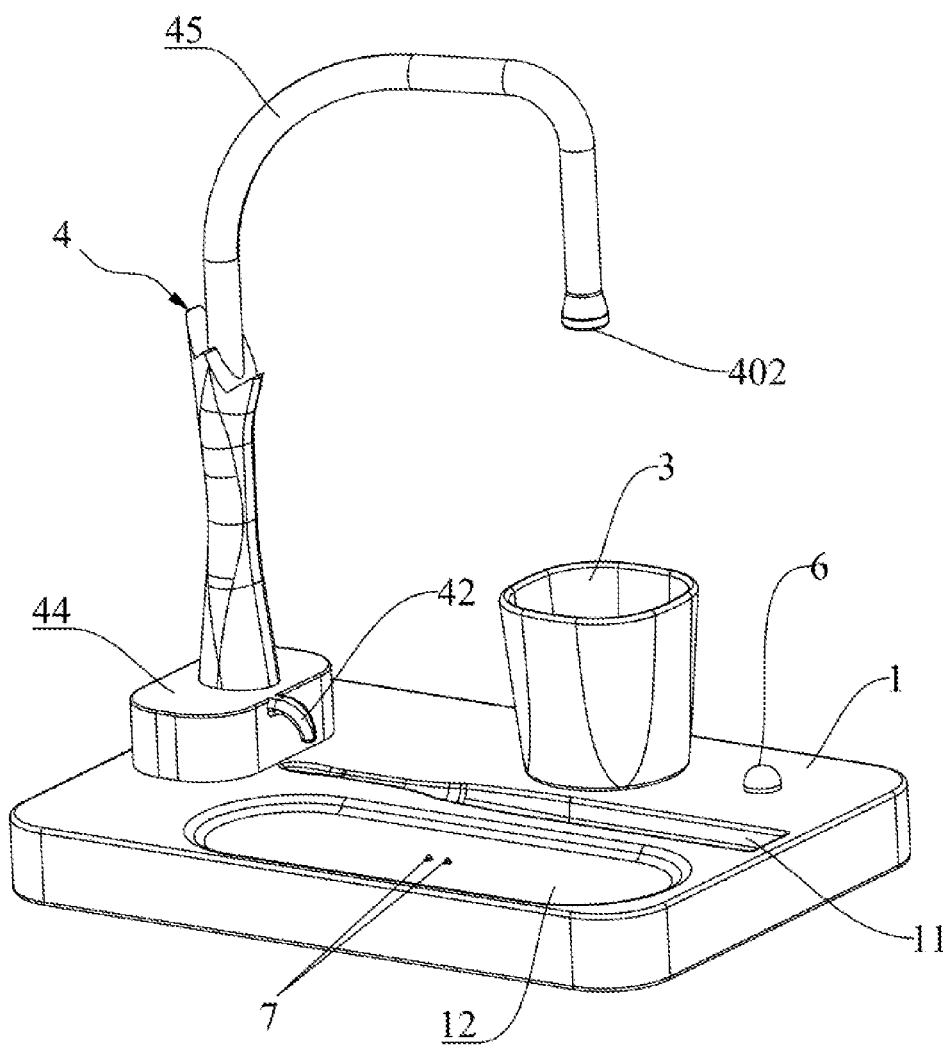
FIG. 1 is structure diagram one of a washing device provided by embodiment one of the present disclosure.

1—support platform; 11—toothbrush slot; 12—shallow groove; 13—power interface; 14—water inlet;

2—first charging stand; 21—first groove;
3—charging cup; 31—cup body; 311—second groove; 32—spherical protrusion;
4—liquid feeder; 402—fluid outlet; 41—on-off switch; 42—cleaning agent output pipe; 43—control switch; 44—base; 45—outlet pipe;
5—power supply management system;
6—second charging stand;
7—third charging stand;
10—electric toothbrush; 101—brush body; 102—brush head; 103—spherical hole; and
20—travel receiving box; 201—upper shell; 2011—second brush body groove; 2012—second brush head groove; 202—lower shell; 2021—first brush body groove; 2022—first brush head groove; 203—fourth charging stand; 204—charging interface.

DETAILED DESCRIPTION

To make solved problems, adopted solutions and achieved effects of the present disclosure clearer, solutions of the present disclosure are further described hereinafter in conjunction with drawings and embodiments. It is to be understood that embodiments described hereinafter are intended to explain the present disclosure and not to limit the present disclosure. For ease of description, only a part, not all, related to the present disclosure is illustrated in the drawings.

In the description of the embodiment of the present disclosure, it should be understood that the orientational or positional relationships indicated by terms "center", "above", "below", "left", "right", "vertical", "horizontal", "inside", "outside" and the like are based on the orientational or positional relationships illustrated in the drawings, which are for the mere purpose of facilitating and simplifying the description of the present disclosure, and these relationships do not indicate or imply that the device or component referred to has a specific orientation and is constructed and operated in a specific orientation, and thus it is not to be construed as limiting the present disclosure. Moreover, terms like "first" and "second" are merely for description and are not to be construed as indicating or implying relative importance.

In the description of the embodiment of the present disclosure, it should be noted that unless otherwise expressly specified and limited, terms like "mounted", "connected to each other", "connected" are to be construed in a broad sense, for example, as permanently connected, detachably connected; mechanically connected or electrically connected; directly connected or indirectly connected via an intermediate medium; or internally connected of two elements. For those of ordinary skill in the art, specific meanings of the preceding terms in the present disclosure may be understood based on specific situations.

Embodiment One

This embodiment provides a washing device capable of heating liquid (for example, water) in a charging cup 3, which reduces water waste and prevents energy waste on the basis of using hot water for gargling and has high intelligence and convenience.

As shown in FIG. 1, the washing device includes a support plate 1, a first charging stand 2, a charging cup 3, a liquid feeder 4 and a power supply management system 5, the first charging stand 2, the charging cup 3, the liquid feeder 4, and the power supply management system 5 are separately disposed on the support plate 1.

Figure 2:
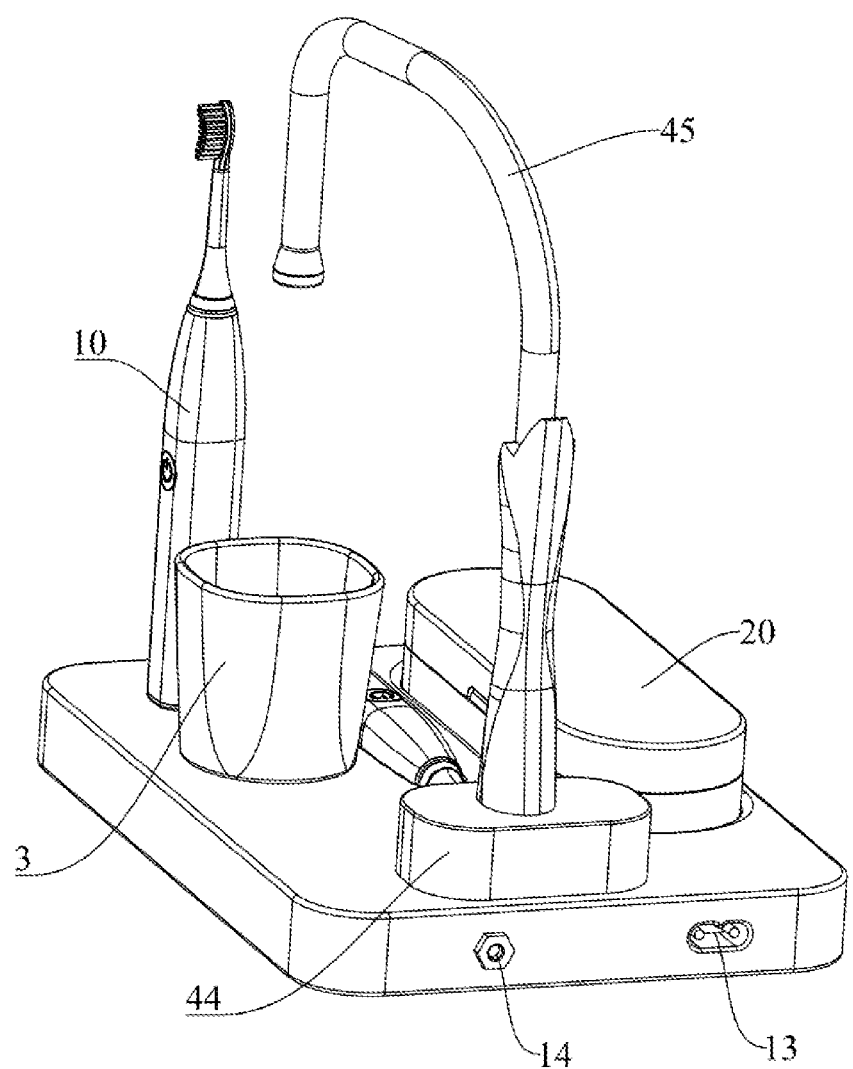
FIG. 2 is structure diagram two of a washing device provided by embodiment one of the present disclosure.

The support plate 1 is provided with an accommodation chamber (not shown), and the power supply management system 5 is disposed in the accommodation chamber. A top surface of the support plate 1 is provided with the first charging stand 2, and the first charging stand 2 is electrically connected to the power supply management system 5, so that the power supply management system 5 is capable of supplying electric energy to the first charging stand 2. Exemplarily, the power supply management system 5 is electrically connected to an external power supply through a power supply interface 13 as shown in FIG. 2, so that the external power supply supplies power to the power supply management system 5, and the power supply management system 5 controls the power supply to or the power supply not to the first charging stand 2.

The first charging stand 2 is electrically connected to the charging cup 3. In an embodiment, the charging cup 3 includes a cup body 31 and a heating member (not shown) disposed in the cup body 31, and the heating member is capable of being electrically connected to the first charging stand 2, so that the first charging stand 2 can supply the electric energy to the heating member, thereby causing the heating member to emit heat to heat the water in the cup body 31.

In some embodiments, the heating member is embedded in a bottom and/or a side wall of the cup body 31, and the heating member has a connecting structure exposed outside the cup body 31. The connecting structure is used for electrically connecting the first charging stand 2 so that the first charging stand 2 supplies the electric energy to the heating member through the connecting structure.

Figure 3:
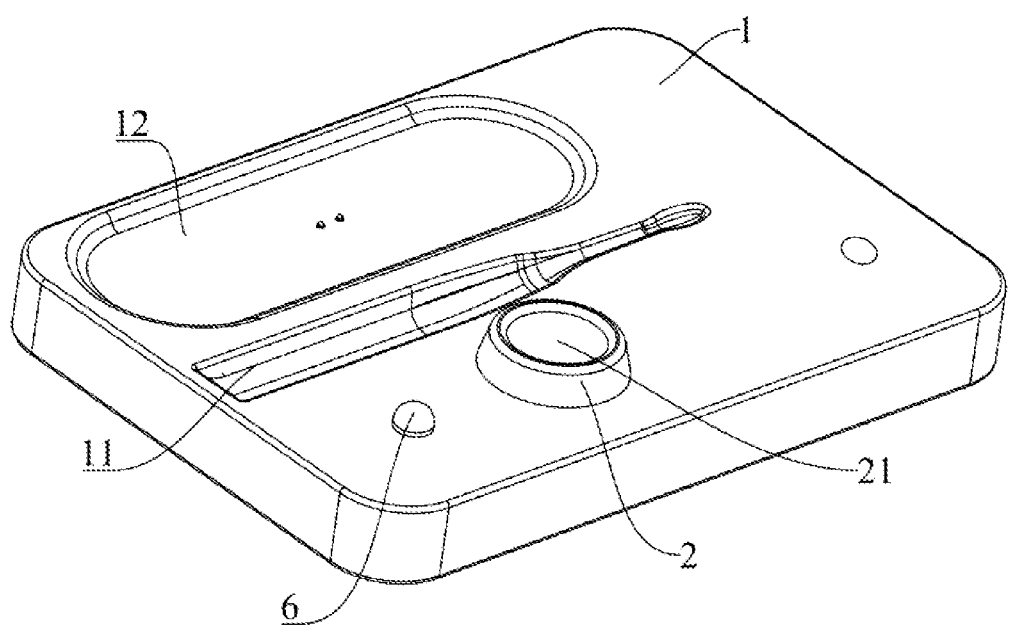
FIG. 3 is a structural diagram of a support plate, a first charging stand and a second charging stand provided by embodiment one of the present disclosure.
Figure 4:
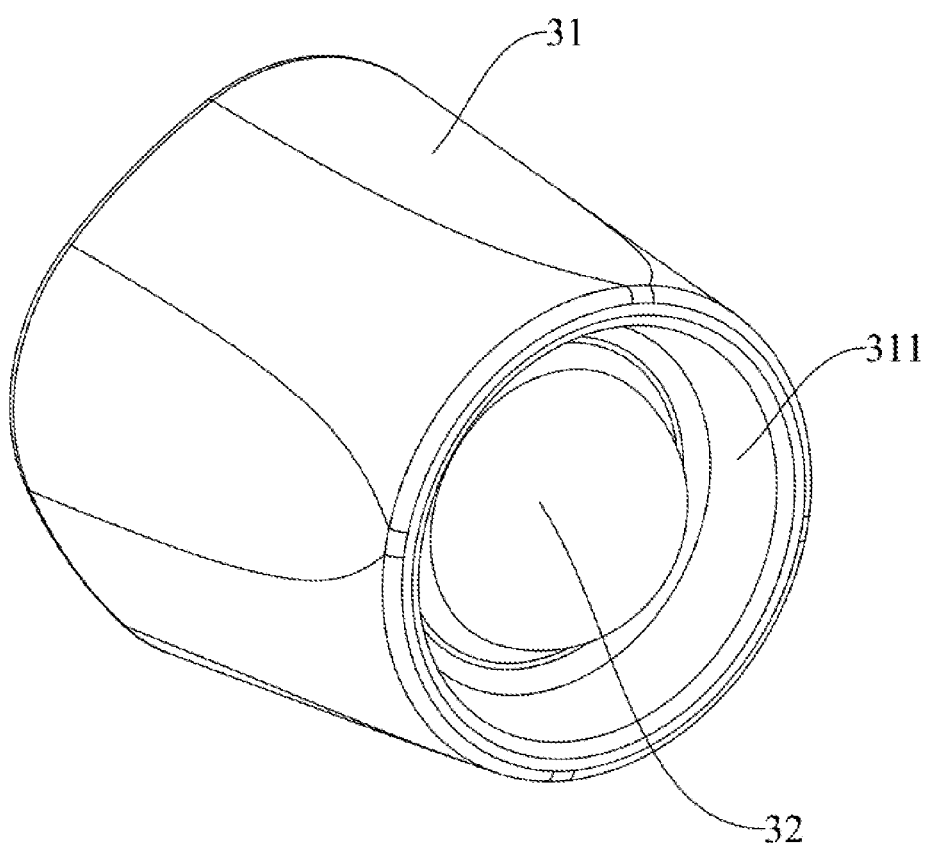
FIG. 4 is a structural diagram of a charging cup provided by embodiment one of the present disclosure.
Figure 5:
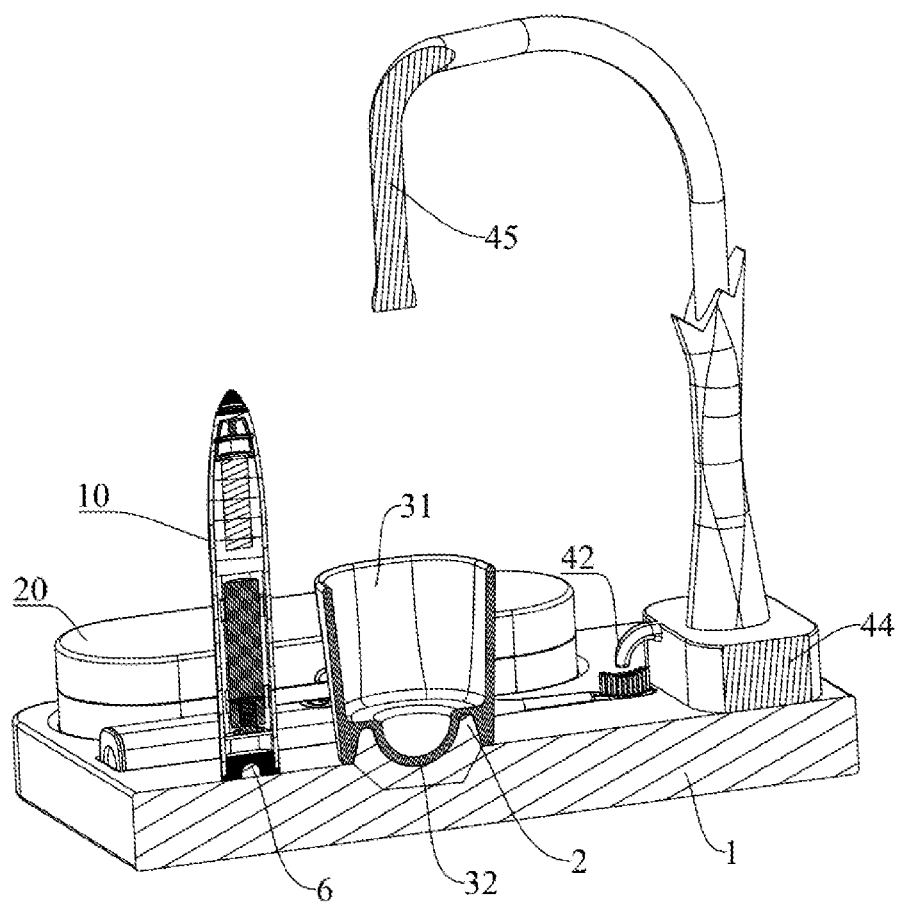
FIG. 5 is sectional view of a washing device provided by embodiment one of the present disclosure.

In other embodiments, as shown in FIG. 3, the first charging stand 2 is in the shape of frustum of a cone, and the top surface of the first charging stand 2 is provided with a first groove 21 which is hemispherical-shaped. As shown in FIG. 4, an end face of a bottom end of the cup body 31 is provided with a second groove 311, and as shown in FIG. 5, the cup body 31 is sleeved on the first charging stand 2 through the second groove 311. The heating member includes a spherical protrusion 32 disposed in the second groove 311, and when the first charging stand 2 is inserted in the second groove 311, the spherical protrusion 32 is located in the first groove 21 and is electrically connected to the first charging stand 2. Through the connection mode of the first charging stand 2 and the charging cup 3, on the one hand, the charging cup 3 can be inserted on the first charging stand 2, so that the charging cup 3 can be more stable and is not easy to shake; on the other hand, the heating member and the first charging stand 2 can have a larger contact area, which improves the reliability of the electrical connection between the heating member and the first charging stand 2. It is to be understood that the heating member may also include a resistance wire, a resistance plate and the like embedded in the cup wall. The resistance wire, the resistance plate and the like are electrically connected to the spherical protrusion 32 to improve the efficiency of heating the liquid.

As shown in FIG. 1, the liquid feeder 4 is fixedly arranged on the support plate 1, and the liquid feeder 4 has a fluid inlet, a fluid outlet 402 and an on-off switch 41. The fluid inlet can communicate with an external water source such that the external water source supplies water to the feeder 4 through the fluid inlet. In some embodiments, as shown in FIG. 2, the side wall of the support plate 1 has a water inlet 14, the fluid inlet communicates with the water inlet 14 to communicate the water inlet 14 with the external water source. The fluid outlet 402 is capable of being located above the charging cup 3 so that the feeder 4 is capable of adding water to the charging cup 3 through the fluid outlet 402.

Figure 6:
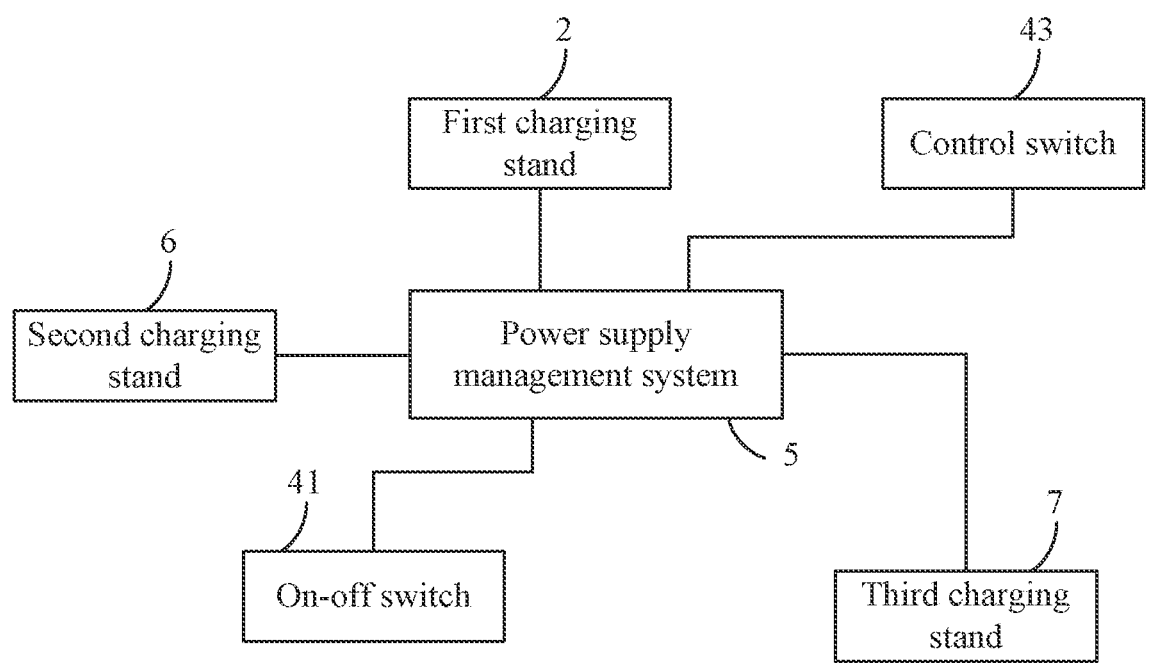
FIG. 6 is a schematic diagram of connections of part of structures of a washing device provided by embodiment one of the present disclosure.
Figure 7:
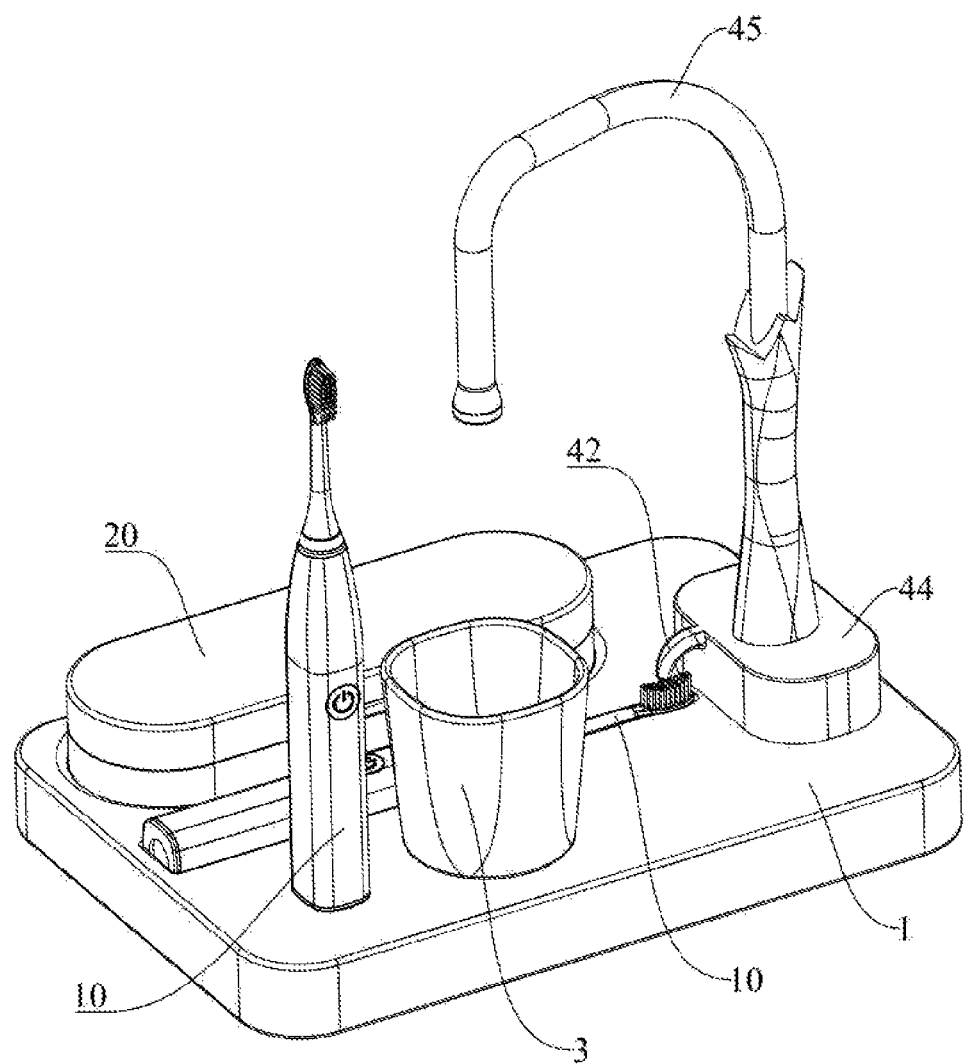
FIG. 7 is a structural diagram showing a smart home apparatus provided by embodiment two of the present disclosure.
Figure 8:
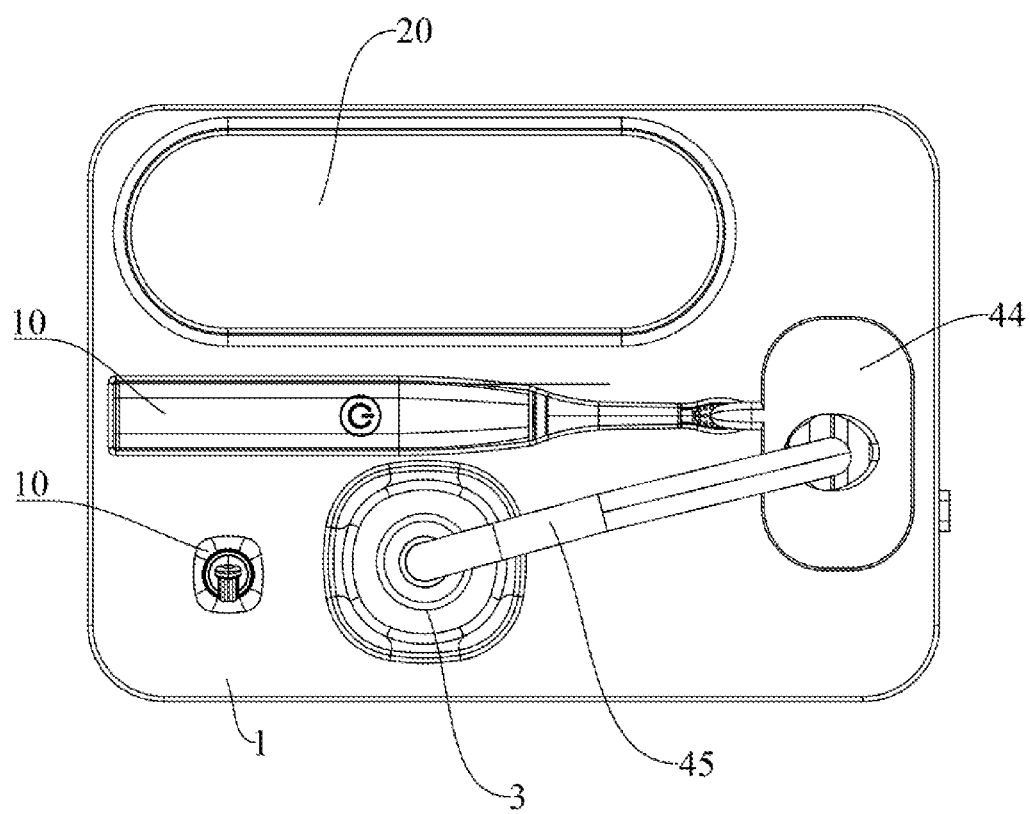
FIG. 8 is a top view of a smart home apparatus provided by embodiment two of the present disclosure.
Figure 9:
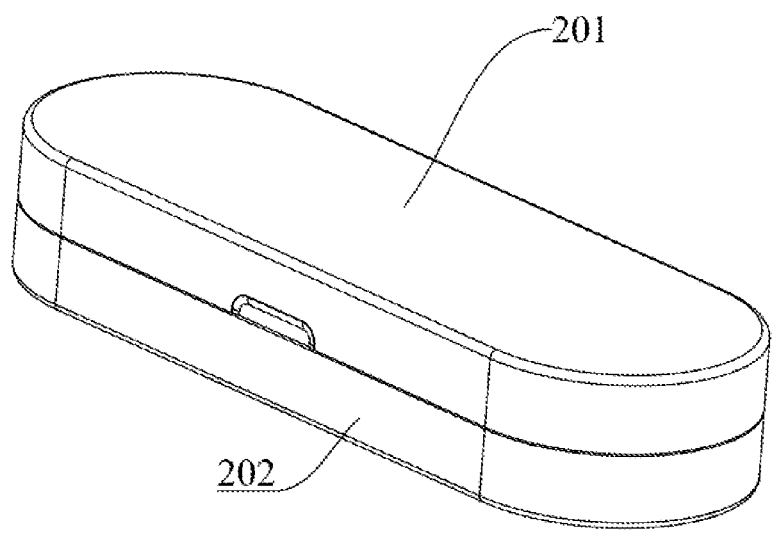
FIG. 9 is a structural diagram of a travel receiving box provided by embodiment two of the present disclosure.

Referring to FIG. 6, the power supply management system 5 controls the first charging stand 2 and the on-off switch 41 as well as is connected to the first charging stand 2 and the on-off switch 41. The power supply management system 5 is used for receiving a start-up instruction, and controlling the on-off switch 41 to be turned on according to the start-up instruction to supply liquid to the charging cup 3. Exemplarily, the power supply management system 5 generates a first control instruction according to the start-up instruction for controlling the on-off switch 41 to be turned on to enable the liquid feeder 4 to add a second preset amount of liquid to the charging cup 3. The power supply management system 5 can also control the first charging stand 2 to be electrified according to the start-up instruction so as to heat the liquid in the charging cup 3 by the heating member. Exemplarily, the power supply management system 5 generates a second control instruction according to the start-up instruction. The second control instruction is configured to control the first charging stand 2 to be electrified so that the first charging stand 2 supplies power to the heating member and heats the liquid in the charging cup 3 to a first preset temperature through the heating member.

Optionally, the power supply management system 5 may be communicatively connected to a washing control APP in an electronic device so that the washing control APP in the electronic device is capable of transmitting the start-up instruction to the power supply management system 5. Reference can be made to the existing art for the working principle and specific structure of the power management system 5. Exemplarily, this embodiment provides a power supply management system 5. The power supply management system 5 includes a communication module, a processing module and a transmitter module. The communication module is configured to communicatively connected to the washing control APP of the electronic device to receive the start-up instruction, the processing module processes the start-up instruction and generates a first control instruction and a second control instruction, and the transmitter module is configured to transmit the first control instruction to the on-off switch 41 and the second control instruction to the first charging stand 2. In this embodiment, the washing control APP in the electronic device has a reservation function. That is, the washing control APP can automatically wake up at a preset time point and transmit the start-up instruction to the power supply management system 5. Optionally, the washing control APP may also have a function of reminding the user to wash in a preset time after starting the start-up instruction so as to prevent the water in the charging cup 3 from cooling and achieve a smart home wake-up mode. It is to be understood that the start-up instruction may also be transmitted to the power supply management system 5 by another device, which is not limited in this embodiment.

In the washing device provided by this embodiment, the start-up instruction is transmitted to the power supply management system 5, so that the power supply management system 5 can control the on-off switch 41 to be turned on first, so that the liquid feeder 4 can add a proper amount of water into the charging cup 3, and then the power supply management system 5 controls the first charging stand 2 to be electrified so as to provide electric energy to the heating member, thereby causing the heating member to heat water in the cup body 31, achieving automatically water adding to the charging cup 3 and automatically water heating in the charging cup, providing convenience for the user's washing, reducing the water waste and preventing the energy waste on the basis of using the hot water for gargling.

To further improve the convenience of the washing device, the liquid feeder 4 may also have a cleaning agent chamber (not shown), a cleaning agent output pipe 42 and a control switch 43. The cleaning agent chamber is configured to hold a cleaning agent, such as toothpaste, and the cleaning agent output pipe 42 communicates with the cleaning agent chamber so that the cleaning agent in the cleaning agent chamber can enter the cleaning agent output pipe 42. The control switch 43 is disposed in the cleaning agent output pipe 42 to control the cleaning agent output pipe 42 to be turned on or turned off. In a case where the cleaning agent output pipe 42 is turned on, the cleaning agent is capable of flowing to an outlet of the cleaning agent output pipe 42. In a case where the control switch 43 is turned off, the cleaning agent is incapable of flowing to the outlet of the cleaning agent output pipe 42. In some embodiments, the control switch 43 may be one solenoid valve.

In order to make the cleaning agent flow out smoothly, there exists a driving source providing a driving force to the cleaning agent in the cleaning agent chamber. Exemplarily, the driving source may be a push plate provided in the cleaning agent chamber, the power supply management system 5 can control the push plate to move to extrude the cleaning agent. Optionally, the power supply management system 5 may drive the push plate to move by a driving member such as a motor. Alternatively, the driving source may drive the push plate to move by a pressure differential driving principle, and will not be repeated in this embodiment. Exemplarily, a toothpaste extruder is provided within the liquid feeder 4 for extruding the cleaning agent.

Further, the power supply management system 5 controls the control switch 43 and is connected to the control switch 43, and the power supply management system 5 is also configured to control the control switch 43 to be turned on according to the start-up instruction to output a first preset amount of cleaning agent outward through the cleaning agent output pipe 42. That is, the washing device provided by this embodiment has the function of adding toothpaste quantitatively.

In this embodiment, referring to FIG. 3, a surface of the support plate 1 is provided with a toothbrush slot 11. A toothbrush slot 11 is configured to place a toothbrush. When the toothbrush is located in the toothbrush slot 11, one end of the toothbrush with bristles is located at one end of the toothbrush slot 11, and the outlet of the cleaning agent output pipe 42 is opposite to one end of the toothbrush slot 11 in a vertical direction, so that the cleaning agent flowing out of the cleaning agent output pipe 42 can directly fall on the bristles of the toothbrush, further improving the convenience and intelligence of the washing device.

As shown in FIG. 1 or 2, the liquid feeder 4 includes a base 44 and a liquid outlet pipe 45. The liquid outlet pipe 45 may rotatably disposed on the base 44 so as to adjust an outlet of the liquid outlet pipe 45 (i.e., the above liquid outlet 402) to be directly faced the charging cup 3. In some embodiments, the liquid feeder 4 includes a rotating electric motor so that the liquid outlet pipe 45 is driven to rotate relative to the base 44 through the rotating electric motor. The fluid inlet, the on-off switch 41 and the cleaning agent chamber are separately disposed at the base 44, and the fluid outlet 402 is disposed at one end of the liquid outlet pipe 45.

Figure 12:
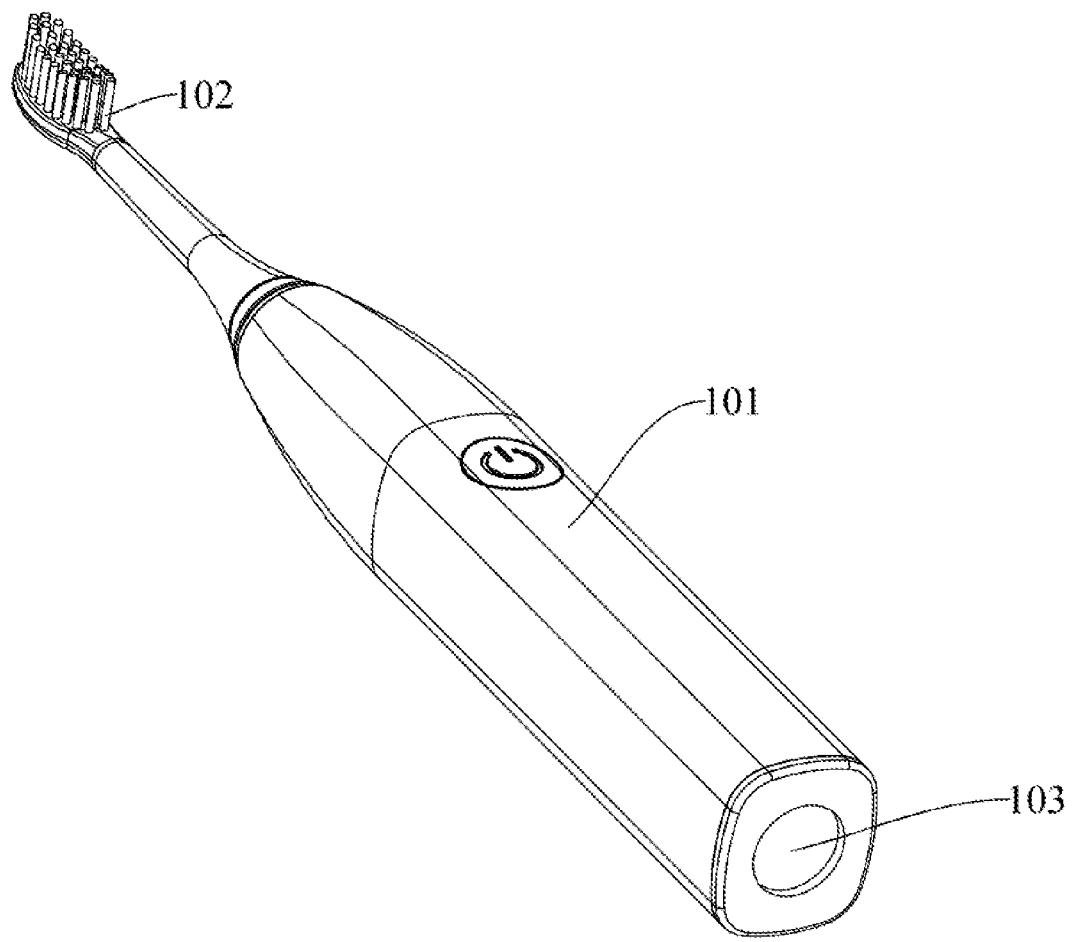
FIG. 12 is a structural diagram of an electronic toothbrush provided by embodiment two of the present disclosure.

The washing device provided in this embodiment may also charge the electric toothbrush 10. In an embodiment, as shown in FIG. 3, the top surface of the support plate 1 is provided with a second charging stand 6. The second charging stand 6 is hemispherical-shaped and protrudes from the support plate 1, and the second charging stand 6 is configured to charge the electric toothbrush 10. As shown in FIG. 12, a bottom end of the electric toothbrush 10 has a spherical hole 103, and the electric toothbrush 10 can be inserted on the second charging stand 6 through the spherical hole 103 and be electrically connected to the second charging stand 6. In some embodiments, the power supply management system 5 controls the second charging stand 6 and is connected to the second charging stand 6, and the power supply management system 5 is configured to, when the electric toothbrush 10 is detected to be inserted on the second charging stand 6, control the second charging stand 6 to be energized to be able to charge the electric toothbrush 10. In other embodiments, when the electric toothbrush 10 is inserted on the second charging stand 6, the second charging stand 6 is capable of charging the electric toothbrush 10.

Optionally, as shown in FIG. 3, the top surface of the support plate 1 may be provided with a shallow groove 12, and a bottom of the shallow groove 12 is provided with a third charging stand 7, and the third charging stand 7 is configured to charge the travel receiving box 20. Exemplarily, the third charging stand 7 includes two charging pins. The charging pins are inserted into the charging interface 204 of the travel receiving box 20 to charge the travel receiving box 20. In some embodiments, the power supply management system 5 controls the third charging stand 7 and is connected to the third charging stand 7, and the power supply management system 5 is configured to, when the travel receiving box 20 is detected to be inserted on the third charging stand 7, control the third charging stand 7 to be electrified to be able to charge the travel receiving box 20. In other embodiments, when the travel receiving box 20 is inserted on the third charging stand 7, the third charging stand 6 is capable of charging the travel receiving box 20.

The washing device provided by this embodiment can achieve the functions of automatically water flushing and heating the charging cup 3 and quantitatively toothpaste adding to the toothbrush under the control of the power supply management system through the washing control APP of the electronic device, which is convenient for the users to use and prevents the water waste.

Embodiment Two

This embodiment provides a control method of a washing device, which is applied to the washing device described in embodiment one. The control method of the washing device includes steps described below.

In S1: a start-up instruction is received.

In this embodiment, the start-up instruction is received through a power supply management system 5.

In S2: a first control instruction is generated according to the start-up instruction, the first control instruction is configured to control an on-off switch 41 to be turned on, so that the liquid feeder 4 is capable of adding a second preset amount of liquid to the charging cup 3.

In this embodiment, the power supply management system 5 generates the first control instruction according to the start-up instruction.

In S3: a second control instruction is generated according to the start-up instruction, the second control instruction is configured to control the first charging stand 2 to be electrified, so that the first charging stand 2 supplies power to a heating member, and liquid in the charging cup 3 is heated to a first preset temperature through the heating member.

In this embodiment, the power supply management system 5 generates the second control instruction according to the start-up instruction.

In the control method of the washing device provided by this embodiment, the start-up instruction is transmitted to the power supply management system 5, so that the power supply management system 5 can control the on-off switch 41 to be turned on first, so that the liquid feeder 4 can add a proper amount of water into the charging cup 3, and then the power supply management system 5 controls the first charging stand 2 to be electrified so as to provide electric energy to the heating member, thereby causing the heating member to heat water in the cup body 31, achieving automatically water adding to the charging cup 3 and automatically water heating in the charging cup, providing convenience for the user's washing, reducing the water waste and preventing the energy waste on the basis of using the hot water for gargling.

Optionally, after the liquid in the charging cup 3 is heated to a first preset temperature, the power supply management system 5 may generate a third control instruction according to the start-up instruction. The third control instruction is configured to control a control switch 43 to be turned up so as to add a first preset amount of cleaning agent to the toothbrush in the toothbrush slot 11 through the cleaning agent output pipe 42.

Embodiment Three

This embodiment also provides a smart home apparatus. As shown in FIGS. 7 to 12, the smart home apparatus includes an electric toothbrush 10, a travel receiving box 20 and a washing device described in embodiment one. The electric toothbrush 10 is located in a toothbrush slot 11 of the washing device or inserted in a second charging stand 6 of the washing device. When the electric toothbrush 10 needs to catch the cleaning agent, the electric toothbrush 10 is located in the toothbrush slot 11. When the electric toothbrush 10 needs to be charged, the electric toothbrush 10 is inserted on the second charging base 6. It is to be understood that multiple electric toothbrushes 10 may be provided. The multiple electric toothbrushes 10 include the electric toothbrush 10 located in the toothbrush slot 11 and the electric toothbrush 10 inserted on the second charging stand 6. The travel receiving box 20 can be inserted on the third charging stand 7 of the washing device.

Figure 10:
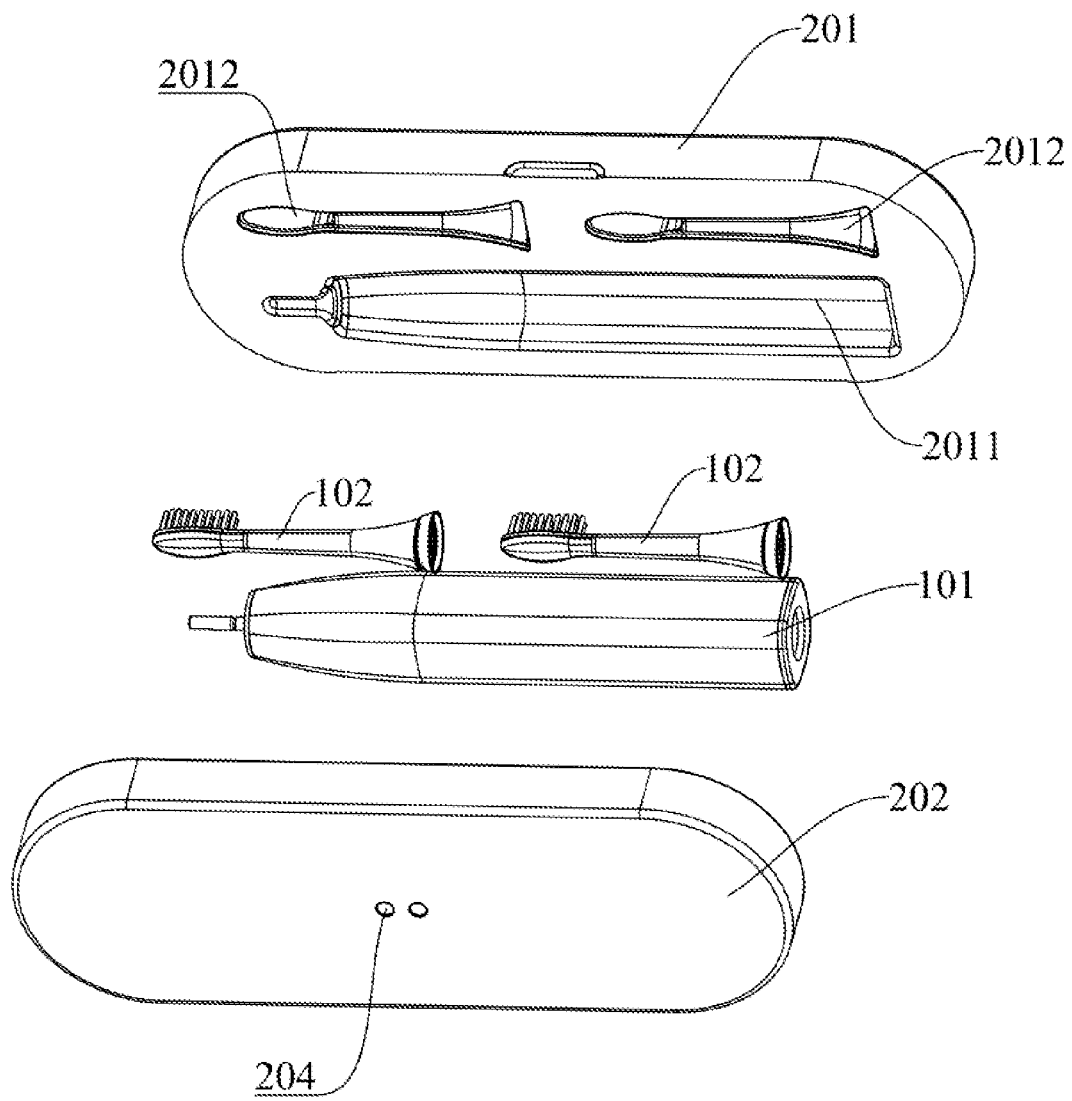
FIG. 10 is an exploded view one of a travel receiving box provided by embodiment two of the present disclosure.
Figure 11:
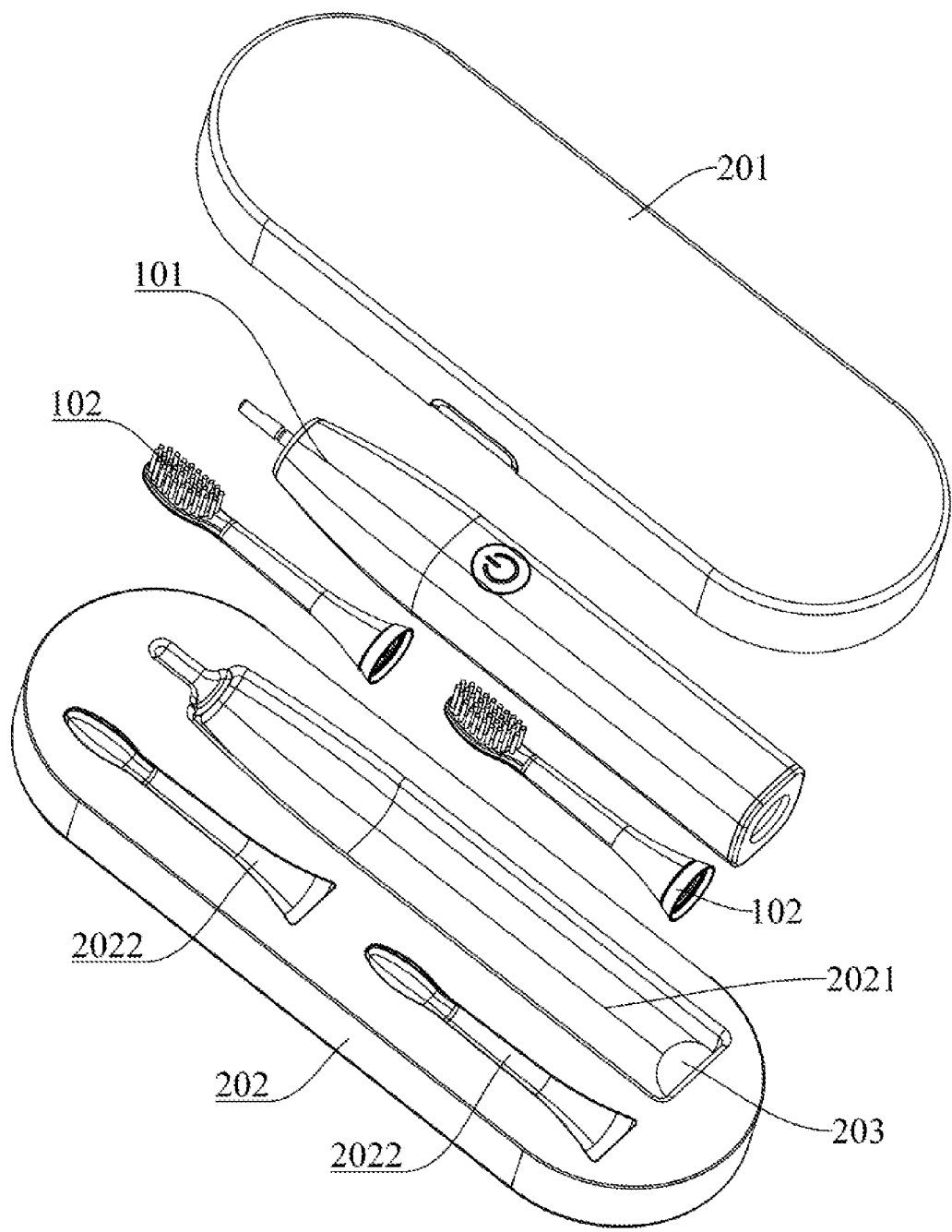
FIG. 11 is an exploded view two of a travel receiving box provided by embodiment two of the present disclosure.

Further, as shown in FIGS. 10 and 11, the travel receiving box 20 includes an upper 201, a lower shell 202, a rechargeable battery (not shown) and a charging interface 204. The upper shell 201 is detachably connected to the lower shell 202, and the rechargeable battery is disposed on the lower shell 202 and is electrically connected to the charging interface 204. The charging interface 204 is disposed on a bottom wall of the lower shell 202, and a top surface of the lower shell 202 is provided with a first brush body groove 2021 and multiple first brush head grooves 2022. The first brush body groove 2021 is configured to accommodate the brush body 101 of the electric toothbrush 10. In this embodiment, as shown in FIG. 11, an inner wall of one end of the first brush body groove 2021 is provided with a fourth charging stand 203 and the fourth charging stand 203 is configured to charge the electric toothbrush 10 located in the first brush body groove 2021. Exemplarily, the fourth charging stand 203 is a hemispherical conductor and the first brush head slot 2022 is configured to receive a brush head 102 of the electric toothbrush 10. It is to be understood that the travel receiving box 20 may also not include the fourth charging stand 203, but include a first wireless charging module, and the electric toothbrush 10 is provided with a second wireless charging module. The travel receiving box 20 can charge the electric toothbrush 10 through the first wireless charging module and the second wireless charging module.

Referring to FIG. 1, a surface of the upper shell 201 facing toward the lower shell 202 is provided with a second brush body groove 2011 and multiple second brush head grooves 2012. The second brush body groove 2011 and the first brush body groove 2021 can form a first chamber, and the first chamber can accommodate the brush body 101. Multiple second brush head grooves 2012 one-to-one correspond to multiple first brush head grooves 2022. The second brush head groove 2012 and the first brush head groove 2022 corresponding to the second brush head groove 2012 can form a second chamber, and one second chamber can accommodate one brush head 102.

Further, multiple sterilization ultraviolet lamps are disposed in the travel receiving box 20, and the sterilization ultraviolet lamps are configured to sterilize the brush body 101 in the first chamber or the brush head in the second chamber. Optionally, the upper shell 201 and the lower shell 202 may be made of sterile materials respectively.

Optionally, the electric toothbrush 10 may also include a pressure detection system disposed at the brush head 102. The pressure detection system can sense an operation force acting on the brush head 102, and the pressure detection system controls a vibration member of the brush body 101 and is connected to the vibration member of the brush body 101. When the operation pressure is within a normal range that gums can bear, an amplitude and a frequency of the vibration member are unchanged so that an amplitude of the brush head 102 is maintained. When the operation pressure is greater than a preset force, the pressure detection system controls the vibration member to reduce the amplitude so as to effectively protect the health of teeth and oral cavity. It is to be noted that the electric toothbrush 10 provided by this embodiment has functions of a brushing time reminder, an incremental starting and a pattern memory.

In the smart home apparatus provided by this embodiment, the start-up instruction is transmitted to the power supply management system 5, so that the power supply management system 5 can control the on-off switch 41 to be turned on first, so that the liquid feeder 4 can add a proper amount of water into the charging cup 3, and then the power supply management system 5 controls the first charging stand 2 to be electrified so as to provide electric energy to the heating member, thereby causing the heating member to heat water in the cup body 31, achieving automatically water adding to the charging cup 3 and automatically water heating in the charging cup, providing convenience for the user's washing, reducing the water waste and preventing the energy waste on the basis of using the hot water for gargling.

The preceding embodiments describe only the basic principles and characteristics of the present disclosure and the present disclosure is not limited to the preceding embodiments. Various modifications and changes may be made in the present disclosure without departing from the spirit and scope of the present disclosure. These modifications and changes fall within the scope of the present disclosure. The scope of the present disclosure is defined by the appended claims and equivalents thereof.

What is claimed is:

1. A washing device, comprising:
a support plate, wherein the support plate is provided with an accommodation chamber, and a top surface of the support plate is provided with a first charging stand;
a charging cup, wherein the charging cup comprises a cup body and a heating member disposed in the cup body, and the heating member is capable of being electrically connected to the first charging stand;
a liquid feeder, which is fixedly disposed on the support plate, and the liquid feeder is provided with a fluid inlet, a fluid outlet and an on-off switch, and the fluid outlet is capable of being positioned above the charging cup; and
a power supply management system, which is disposed in the accommodation chamber, wherein the power supply management system is connected to the first charging stand and the on-off switch and is configured to control the first charging stand and the on-off switch, the power supply management system is configured to receive a start-up instruction, control the on-off switch to be turned on according to the start-up instruction to supply liquid the charging cup, and control the first charging stand to be electrified according to the start-up instruction to heat the liquid in the charging cup through the heating member.

2. The washing device of claim 1, wherein the liquid feeder is further provided with a cleaning agent chamber, a cleaning agent output pipe communicated with the cleaning agent chamber and a control switch disposed in the cleaning agent output pipe, the power supply management system is connected to the control switch and is configured to control the control switch, and the power supply management system is further configured to control the control switch to be turned on according to the start-up instruction to output a first preset amount of cleaning agent outward through the cleaning agent output pipe.

3. The washing device of claim 2, wherein a toothbrush slot is disposed on a surface of the support plate, and an outlet of the cleaning agent output pipe is opposite to one end of the toothbrush slot in a vertical direction.

4. The washing device of claim 1, wherein the liquid feeder comprises a base and a liquid outlet pipe rotatably disposed on the base, the fluid inlet and the on-off switch are separately disposed on the base, and the fluid outlet is disposed at one end of the liquid outlet pipe.

5. The washing device of claim 1, wherein the first charging stand has a shape of frustum of a cone, and the top surface of the first charging stand is provided with a first groove which is hemispherical-shaped, an end face of a bottom end of the cup body is provided with a second groove, the heating member comprises a spherical protrusion disposed in the second groove, the first charging stand is inserted in the second groove, and the spherical protrusion is located in the first groove and is electrically connected to the first charging stand.

6. The washing device of claim 1, wherein the top surface of the support plate is further provided with a second charging stand, the second charging stand is hemispherical-shaped, and the second charging stand is configured to charge an electric toothbrush.

7. The washing device of claim 1, wherein the top surface of the support plate is provided with a shallow groove, and a bottom of the shallow groove is provided with a third charging stand, and the third charging stand is configured to charge the travel receiving box.

8. A smart home apparatus, comprising an electric toothbrush, a travel receiving box and a washing device, wherein the washing device comprises:
- a support plate, wherein the support plate is provided with an accommodation chamber, and a top surface of the support plate is provided with a first charging stand;
- a charging cup, wherein the charging cup comprises a cup body and a heating member disposed in the cup body, and the heating member is capable of being electrically connected to the first charging stand;
- a liquid feeder, which is fixedly disposed on the support plate, and the liquid feeder is provided with a fluid inlet, a fluid outlet and an on-off switch, and the fluid outlet is capable of being positioned above the charging cup; and
- a power supply management system, which is disposed in the accommodation chamber, wherein the power supply management system is connected to the first charging stand and the on-off switch and is configured to control the first charging stand and the on-off switch, the power supply management system is configured to receive a start-up instruction, control the on-off switch to be turned on according to the start-up instruction to supply liquid the charging cup, and control the first charging stand to be electrified according to the start-up instruction to heat the liquid in the charging cup through the heating member; and
- wherein the electric toothbrush is located in a toothbrush slot of the washing device or inserted in a second charging stand of the washing device, and the travel receiving box is capable of being inserted in a third charging stand of the washing device.

9. The smart home apparatus of claim 8, wherein the travel receiving box comprises an upper shell, a lower shell, a rechargeable battery and a charging interface, wherein the upper shell is detachably connected to the lower shell, the rechargeable battery is disposed on the lower shell, the charging interface is disposed on a bottom wall of the lower shell, a top surface of the lower shell is provided with a first brush body groove and a plurality of first brush head grooves, wherein the first brush body groove is configured to accommodate a brush body of the electric toothbrush, and the plurality of first brush head grooves are configured to accommodate a brush head of the electric toothbrush.

10. The smart home apparatus of claim 8, wherein the liquid feeder is further provided with a cleaning agent chamber, a cleaning agent output pipe communicated with the cleaning agent chamber and a control switch disposed in the cleaning agent output pipe, the power supply management system is connected to the control switch and is configured to control the control switch, and the power supply management system is further configured to control the control switch to be turned on according to the start-up instruction to output a first preset amount of cleaning agent outward through the cleaning agent output pipe.

11. The smart home apparatus of claim 10, wherein a toothbrush slot is disposed on a surface of the support plate, and an outlet of the cleaning agent output pipe is opposite to one end of the toothbrush slot in a vertical direction.

12. The smart home apparatus of claim 8, wherein the liquid feeder comprises a base and a liquid outlet pipe rotatably disposed on the base, the fluid inlet and the on-off switch are separately disposed on the base, and the fluid outlet is disposed at one end of the liquid outlet pipe.

13. The smart home apparatus of claim 8, wherein the first charging stand has a shape of frustum of a cone, and the top surface of the first charging stand is provided with a first groove which is hemispherical-shaped, an end face of a bottom end of the cup body is provided with a second groove, the heating member comprises a spherical protrusion disposed in the second groove, the first charging stand is inserted in the second groove, and the spherical protrusion is located in the first groove and is electrically connected to the first charging stand.

14. The smart home apparatus of claim 8, wherein the top surface of the support plate is further provided with a second charging stand, the second charging stand is hemispherical-shaped, and the second charging stand is configured to charge an electric toothbrush.

15. A control method of a washing device, applied to the washing device, wherein the washing device comprises:
- a support plate, wherein the support plate is provided with an accommodation chamber, and a top surface of the support plate is provided with a first charging stand;
- a charging cup, wherein the charging cup comprises a cup body and a heating member disposed in the cup body, and the heating member is capable of being electrically connected to the first charging stand;
- a liquid feeder, which is fixedly disposed on the support plate, and the liquid feeder is provided with a fluid inlet, a fluid outlet and an on-off switch, and the fluid outlet is capable of being positioned above the charging cup; and
- a power supply management system, which is disposed in the accommodation chamber, wherein the power supply management system is connected to the first charging stand and the on-off switch and controls the first charging stand and the on-off switch, the power supply management system receives a start-up instruction, controls the on-off switch to be turned on according to the start-up instruction to supply liquid the charging cup, and controls the first charging stand to be electrified according to the start-up instruction to heat the liquid in the charging cup through the heating member; and
- wherein the control method comprises:
- receiving the start-up instruction;
- generating a first control instruction according to the start-up instruction, the first control instruction is configured to control the on-off switch to be turned on, so that the liquid feeder is capable of adding a preset amount of liquid to the charging cup; and
- generating a second control instruction according to the start-up instruction, the second control instruction is configured to control the first charging stand to be electrified, so that the first charging stand supplies power to the heating member, and the liquid in the charging cup is heated to a first preset temperature through the heating member.

16. The control method of claim 15, wherein the liquid feeder is further provided with a cleaning agent chamber, a cleaning agent output pipe communicated with the cleaning agent chamber and a control switch disposed in the cleaning agent output pipe, the power supply management system is connected to the control switch and controls the control switch, and the power supply management system further controls the control switch to be turned on according to the start-up instruction to output a first preset amount of cleaning agent outward through the cleaning agent output pipe.

17. The control method of claim 16, wherein a toothbrush slot is disposed on a surface of the support plate, and an outlet of the cleaning agent output pipe is opposite to one end of the toothbrush slot in a vertical direction.

18. The control method of claim 15, wherein the liquid feeder comprises a base and a liquid outlet pipe rotatably disposed on the base, the fluid inlet and the on-off switch are separately disposed on the base, and the fluid outlet is disposed at one end of the liquid outlet pipe.

19. The control method of claim 15, wherein the first charging stand has a shape of frustum of a cone, and the top surface of the first charging stand is provided with a first groove which is hemispherical-shaped, an end face of a bottom end of the cup body is provided with a second groove, the heating member comprises a spherical protrusion disposed in the second groove, the first charging stand is inserted in the second groove, and the spherical protrusion is located in the first groove and is electrically connected to the first charging stand.

20. The control method of claim 15, wherein the top surface of the support plate is further provided with a second charging stand, the second charging stand is hemispherical-shaped, and the second charging stand charges an electric toothbrush.

* * * * *